United States Patent [19]

Meierling

[11] Patent Number: 4,736,383
[45] Date of Patent: Apr. 5, 1988

[54] METHOD FOR MELTING SCRAP OR OTHER MATERIALS AND APPARATUS FOR IMPLEMENTING THE METHOD

[75] Inventor: Peter Meierling, Essen, Fed. Rep. of Germany

[73] Assignee: Fried. Krupp Gesellschaft mit beschränkter Haftung, Essen, Fed. Rep. of Germany

[21] Appl. No.: 944,219

[22] Filed: Dec. 22, 1986

[30] Foreign Application Priority Data

Dec. 20, 1985 [EP] European Pat. Off. ......... 85116373.3

[51] Int. Cl.⁴ .............................................. F27D 17/00
[52] U.S. Cl. .......................................... 373/78; 373/80
[58] Field of Search ...................... 373/79, 80, 81, 1, 2

[56] References Cited

U.S. PATENT DOCUMENTS

| | | | |
|---|---|---|---|
| 1,208,817 | 12/1916 | Moffat | 373/81 |
| 4,455,660 | 6/1984 | Buhler | 373/81 X |
| 4,506,370 | 3/1985 | Yoshimatsu | 373/80 X |
| 4,611,339 | 9/1986 | Saitoh | 373/80 |

Primary Examiner—Roy N. Envall, Jr.
Attorney, Agent, or Firm—Spencer & Frank

[57] ABSTRACT

In a method for melting a material selected from the group consisting of scrap or other similar materials with at least one melting furnace in a crucible equipped with electric arc heating, comprising directly pre-heating the material with the exhaust gases of the melting furnace and charging the material from the pre-heating vessel into a melting vessel prior to charging the heated scrap, each melting vessel is positioned below a stationary pre-heating vessel; and after charging the heated scrap, each melting vessel is positioned back above a stationary melting surface.

40 Claims, 4 Drawing Sheets

METHOD FOR MELTING SCRAP OR OTHER MATERIALS AND APPARATUS FOR IMPLEMENTING THE METHOD

BACKGROUND OF THE INVENTION

1. Field of the Invention

The present invention relates to a method for melting scrap or similar materials in at least one melting furnace. More particularly, this invention relates to the melting of scrap or similar materials in a furnace equipped with electric arc heating, wherein the scrap is directly pre-heated in a vessel which is emptied into the melting furnace.

2. Description of the Background

A large number of scrap pre-heating methods are known. In these processes, it is generally desired to utilize the energy as completely as possible. This energy is found in the form of discernible and latent heat contained in the exhaust gases from the melting furnace. Thus, the largest possible portion of the hot exhaust gases is conducted through a pre-heating vessel.

In many cases the pre-heating vessel is simultaneously the scrap charging container which is disposed in a preheating station in order to heat the scrap. After completion of the pre-heating process this vessel is moved from there by means of a crane and it is then positioned above the open melting vessel where it is emptied.

In the prior art processes, considerable heat losses result from the transportation of the pre-heating vessel. In an improvement over the basic method, higher pre-heating temperatures can be attained if such a vessel is equipped with a refractory lining or is water cooled. However, protecting such vessels against damage particularly during transportation poses considerable difficulties.

SUMMARY OF THE INVENTION

It is an object of the present invention to provide a method of the above-mentioned type and an associated apparatus which better utilize the energy contained in the exhaust gases from the melting vessel while saving energy, particularly expensive electric energy required for the melting step conducted in the melting vessel.

The above and other objects are attained by a novel method of melting a material selected from the group consisting of scrap and other materials in at least one melting vessel in a melting furnace, comprising directly pre-heating the material with exhaust gases from the melting furnace in at least one pre-heating vessel which can be emptied and charging the material into a melting vessel, the improvement wherein prior to charging the heated material, each melting vessel is positioned below a stationary pre-heating vessel; and after charging the heated material, each melting vessel is positioned back above a stationary melting furnace.

The above and other objects are also attained by a novel apparatus for melting a material selected from the group consisting of scrap and other metal materials comprising a melting furnace, at least one melting vessel provided in the melting furnace, and at least one pre-heating vessel which can be emptied and wherein the material is pre-heated with exhaust gases from the melting furnace, the improvement wherein the pre-heating vessel is a chute-like vessel having a closable funnel and an exhaust gases intake at its upper end, and a closable charging opening and an exhaust gases outlet at its lower end; and the melting vessel is movable between at least a first position and a second position, the first position being above the melting furnace and the second position being below the pre-heating vessel.

The novel method provides a number of advantages. Only the preheating vessel, or preferably the melting container in the melting furnace need to be moved horizontally, and at that, only over a very short path from a charging station to a melting station and back again to the charging station.

Therefore, the heat losses otherwise associated with the charging process are almost completely eliminated by the present process and apparatus. In the most favorable case, the path to be traversed is only slightly longer than the diameter of the two matching vessels. In the same manner, an exhaust gas supply conduit positioned between the melting furnace and the pre-heating vessel can also be made correspondingly short.

Arc furnaces such as electric arc furnaces heated with alternating or direct current, or plasma furnaces which because of their large supply of energy require short melting periods are suitable for the novel method and apparatus.

In addition to the arc furnaces described hereinabove, other known melting furnaces such as burner-heated vessels or oxygen-inflated or ventilated converters can also be used as melting furnaces with the present invention.

The novel method is also flexible with respect to the number of melting furnaces and pre-heating vessels employed. Depending on the size of the system and the materials employed, melting furnaces and pre-heating vessel may be associated with one another to meet the respective requirements.

A further advantage afforded by the present method and apparatus is that a variety of materials can be used. The materials to be pre-heated are not limited to scrap or to certain types of scrap. The present process and apparatus are applicable in addition to scrap to, inter alia, the manufacture of steel, sponge iron, raw pig iron and pre-reduced ore.

The novel process and apparatus are also applicable to the production of alloyed or highly alloyed steels and can also be used in non-ferrous metallurgy. Commercially available alloying materials such as ferrochromium, ferro-manganese and others can also be used in addition to the types of scrap containing the respective alloy carriers.

Since the pre-heating vessel need not be moved, it can be constructed in a relatively large size and is thus very well suited to accommodate bulky scrap types, billets or other difficult-to-manipulate materials.

Because of the short path traversed by the exhaust gases between the melting furnace and the pre-heating vessel, temperature losses are low and high pre-heating temperatures can be generated solely by the exhaust gas.

The exhaust gases may be subjected in a known manner to further combustion in order to further increase the temperature of the exhaust gases.

Additional energy, preferably from more economical burner heating can also be introduced.

High pre-heating temperatures can thus be attained for scrap. These may reach 900° C. and higher. Due to the high temperature attained, it becomes necessary to cool the conduits and the vessel. The developing waste heat can then advantageously be used to pre-heat the air used to further burn the exhaust gases.

Before being subjected to the influence of high temperatures the floor of the pre-heating vessels are preferably protected from the high temperatures by introducing at least one of lime and other additives such as fluxing agents or the like into the vessel. This is accomplished before charging the scrap or other materials.

If two or more vessels are used in one pre-heating station they may be disposed next to one another and/or above one another. In a juxtaposed arrangement, the gas intake of the vessels are advisably connected alternatingly in series. In this manner, the scrap or other materials can be heated in each one of the vessels to the required high temperatures by introducing the exhaust gas directly from the melting furnace and before it has cooled.

If the vessels are arranged on top of one another, the lowermost vessel is always connected directly to the melting furnace. The exhaust gas exiting from this lowermost vessel subsequently flows through the thereabove disposed vessel or vessels.

It is of particular advantage that the exhaust gases escaping from the vessel during charging are extracted. Their extraction can be conducted very easily due to the stationary arrangement of the vessel or vessels. In this manner, pollution of the environment such as odors from the oily residues generally adhering to the scrap or other materials are reliably avoided in a simple manner.

An economic management of the process is realized by automatic regulation, even there are fluctuations in the metallurgical melting process and in the consistency of the materials employed. This is attained by continuously monitoring the composition and temperatures of the exhaust gases and the consistency values of the scrap or other materials.

The apparatus for implementing the method of the invention has the particular advantage that the pre-heating station can directly follow the scrap vessel, whereby the charging of the vessel is considerably facilitated.

Clogging when the vessel is emptied during charging can be reliably avoided even if the scrap bakes together because the vessel is conically tapered toward the top.

Moreover, lining the charging opening of the vessel permits a considerably improved seal and reliable gas extraction even during charging.

According to the present invention, the cross section of the vessel is configured so that the velocity of the flowing gases is minimized to, for example, values between about 1 and 2 m/s. This considerably improves the heat transfer from the flowing gas. The enlarged cross-section is here limited only by the simultaneously required increase in the diameter of the melting furnace vessel.

The stationary arrangement of the pre-heating vessel makes it further possible to employ a particularly effective refractory lining and/or a cooling system. The heat removed during cooling can advantageously be utilized within the system, particularly for pre-heating the air used for further combustion of the exhaust gases.

The present invention also provides for the use of charging buckets or continuous charging by means of conveyor belts or the like. If continuous charging is employed, it is of advantage to provide an intermediately connected collection vessel which is discharged downwardly and whose size and configuration essentially coincide with that of the pre-heating vessel.

Unimpeded charging is likewise assured by the bucket-like configuration of the charging opening and the fact that parts of it such as the two half shells having the bottom slightly curved downwardly can be folded away toward the sides.

The environmental compatibility of the device is further improved by sealing the connecting pipe provided in the exhaust gas intake conduit by means of a mist of gas. This mist of gas may be formed, for example, by returned exhaust gases or pre-heated air which is subsequently utilized to further burn the exhaust gases.

A further feature of the invention is that a closable opening is provided below the charging opening for the passage of the melting furnace which is encapsulated at that point and provided with an exhaust gas extraction opening. This eliminates the expensive furnace housing which is presently generally required particularly in connection with the use of electric arc furnaces. A low-power suction device is sufficient to remove the dust settled in the furnace hall.

A melting station requires only one movable furnace cover which is provided with an exhaust gases extraction opening. The movement performed by the cover is possibly very small, particularly if no or only very slight tilting movements are performed to discharge material from the melting furnace since such discharge takes place through openings in the floor or a bay of the furnace.

It is advisable to also tilt the furnace cover if the tilting movements to be performed are larger.

No special decoupling of the connecting pipe for the exhaust gas intake conduit is required for raising or tilting the furnace cover if a mist of gas is employed.

Electrodes or plasma burners and also other burners or oxygen lances may be removed from the cover before tilting. When proceeding in this manner, no expensive cover lifting and pivoting mechanism of the conventional type is required. However, the cover can be especially constructed to be laterally displaceable or pivotal even without the use of a lifting device.

The furnace cover can advantageously also be made stationary and especially constructed for this purpose if the melting furnace needs to be moved only in the direction of the pre-heating station. The melting furnace vessel can then be moved into appropriately configured sealing elements disposed for example at a certain angle with respect to the horizontal. With such a configuration it is also possible to encapsulate the entire area in which the melting furnace is moved.

A more complete appreciation of the invention and many of the attendant advantages thereof will be readily perceived as the same becomes better understood by reference to the following detailed description when considered in connection with the accompanying figures.

Other objects, advantages and features of the present invention will become apparent to those skilled in the art from the following discussion.

DESCRIPTION OF THE PREFERRED EMBODIMENTS

Figure 1:
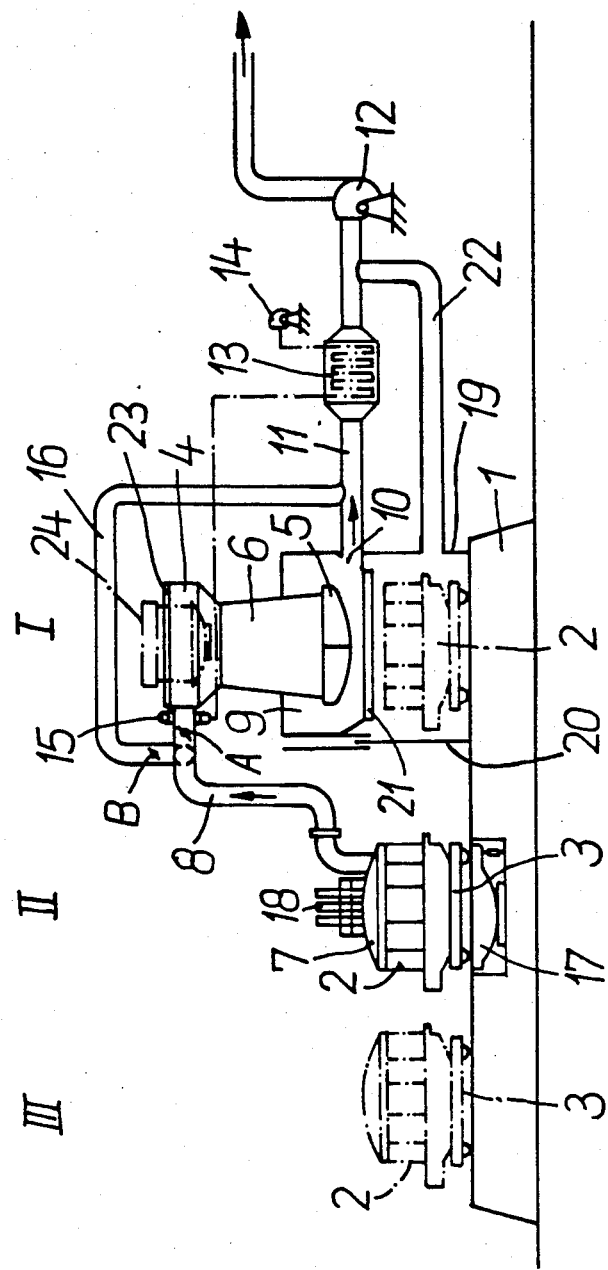
FIG. 1 is a partial vertical sectional view of a system including a stationary pre-heating vessel and a movable melting furnace.

As can be seen in FIG. 1, the crucible, or melting vessel 2 of an electric arc furnace is disposed on a pedestal-like floor 1. The crucible is disposed on a carriage 3 which can be moved back and forth on rails in one direction between a pre-heating station I, a melting station II and a repair station III. The significant part of the pre-heating station I is formed by pre-heating vessel 6 which is provided at its upper end with a closable filling funnel 4, and at its lower end with a closable charging opening 5.

The vessel 6 is conically tapered toward its top and the exhaust gases from the crucible 2 positioned at the melting station flow through it from the top to the bottom. The exhaust gases leaving the crucible 2 are conducted into the intake funnel 4 through an exhaust gas intake conduit 8 connected to the cover 7 of the crucible 2 and leave the vessel 6 at its lower end through respective openings in the closable charging opening 5. From a housing 9 surrounding a charging opening 5, the cooled gas is extracted through an exhaust gas outlet 10 and an exhaust gas discharge conduit 11.

The exhaust gas discharge conduit 11 has an extraction blower 12 connected into it. The exhaust gas discharge conduit 11 opens into a filter device (not shown) for removing dust from the exhaust gases. A heat-exchanger 13 is also connected in the exhaust gas discharge conduit 11. Air introduced into exchanger 13 by a blower 14 is pre-heated by the gas in conduit 11 and introduced into the exhaust gas supply conduit 8 through an annular conduit 15.

The point at which the air is introduced may differ depending on the design of various systems. The most favorable arrangement is determined in accordance with specific requirements in each individual case. The exhaust gas intake conduit 8 and the exhaust gas discharge conduit 11 are connectable to one another by means of a by-pass line 16 which circumvents the vessel 6 and can be blocked in a customary manner.

The pre-heating process in this system takes place as follows. At the start of the melting phase, the exhaust gas escaping from crucible 2 is discharged via a by-pass conduit 16 until it reaches sufficiently high temperatures. Then by-pass conduit 16 is closed and the exhaust gas is conducted through the fill funnel 4 which serves simultaneously as combustion chamber, then through the filled vessel 6, and is extracted through the exhaust gas discharge conduit 11 after leaving housing 9.

The pre-heating process is regulated by controlling the supply of pre-heated air, and possibly by the oxygen supply and additional burner heating. Thus, a desired maximum temperature can be reached at the end of the melting period depending on the type of scrap or other materials involved. When the crucible 2 is emptied through an eccentric floor discharge opening, it is slightly tilted by means of a rocker 17.

The eccentric floor discharge opening is well known in the art and is for example described in British patent specification No. 444 758.

Once it has been emptied, the electrodes 18 are pulled out of the cover 7 and the crucible 2 is moved if necessary to the repair station III for a short period of maintenance service and then to the pre-heating station I.

After the electrodes 18 have been pulled out of the cover 7 the cover itself is lifted from the crucible 2 so that the latter can free move on the rails. Pulling out the electrodes and lifting the cover of an electric arc furnace as used for this purpose is well known in the art and for example described in German patent specification No. 506 303.

Underneath the housing 9, the pre-heating station I is provided with an encapsulation 19 which has a trap door-type closable opening 20 leading to the melting station II for the transfer of the crucible 2.

After the closable opening 20 has been closed, a horizontally movable blocking slide 21 closing the bottom of the housing 9 is opened first and the charging opening 5 is opened thereafter. Charging opening 5 is composed of two half shells which can be folded out laterally by pulling them up. The heated scrap is moved completely into crucible 2 as a result of suitably matched opening speeds thereby avoiding damage.

During charging, the dust is extracted from the housing 9 through the exhaust gas discharge conduit 11 and simultaneously from encapsulation 19 through a conduit 22 opening into the exhaust gas discharge conduit 11. The filled crucible is then moved back to the melting station II where the charged scrap is melted.

After charging, the opening 5 and the slide 21 are closed again and a slide 23 which closes the top of fill funnel 4 is moved away to the side and a charging bucket 24 is introduced into the filling funnel 4 by means of a crane. The bottom of the charging bucket 24 opens in a customary manner.

The vessel 6 is initially filled with lime by means of the charging bucket 24 to form a protective coating on the shells of charging opening 5. Then the scrap or other materials are introduced once or twice depending on their bulkiness and specific weight. Once the slide 23 has been closed again, the next phase of the already described simultaneous melting and pre-heating process begins.

Figure 2:
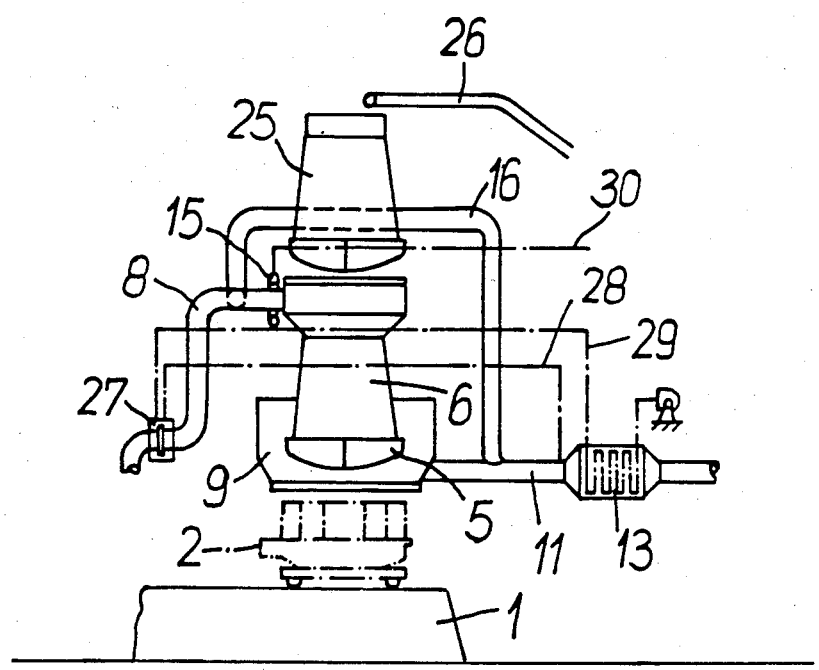
FIG. 2 is a vertical sectional view of the pre-heating station of an apparatus employing continuous charging.

In the embodiment shown in FIG. 2, the system according to FIG. 1 has been modified only by addition of a collecting vessel 25 which is disposed above the vessel 6. The vessel 6 corresponds in structure and volume to vessel 6 except for the filling funnel.

The scrap and the possibly required additives are provided by means of an encapsulated conveyor belt 26 into the open-top collecting vessel 25.

The collecting vessel 25 may also be emptied once or several times into the vessel 6 depending on the type of scrap and the other materials to be pre-heated. The collecting vessel 25 may also be removed again for charging by means of buckets. Thus, both types of charging are possible if necessary or advisable.

FIG. 2 also shows a gas mist connected to a connecting pipe 27 which is included in the exhaust gas intake conduit 8 to seal the opening of the connecting pipe 27. For this purpose, the exhaust gases are returned through a conduit 28 from the exhaust gas discharge conduit 11. Alternately, air pre-heated in the heat-exchanger 13 and introduced through conduit 29 can be employed exclusively or simultaneously with the exhaust gases. Moreover, oxygen introduced for the further combustion of CO is returned through a conduit 30 to the annular conduit 15.

Figure 3:
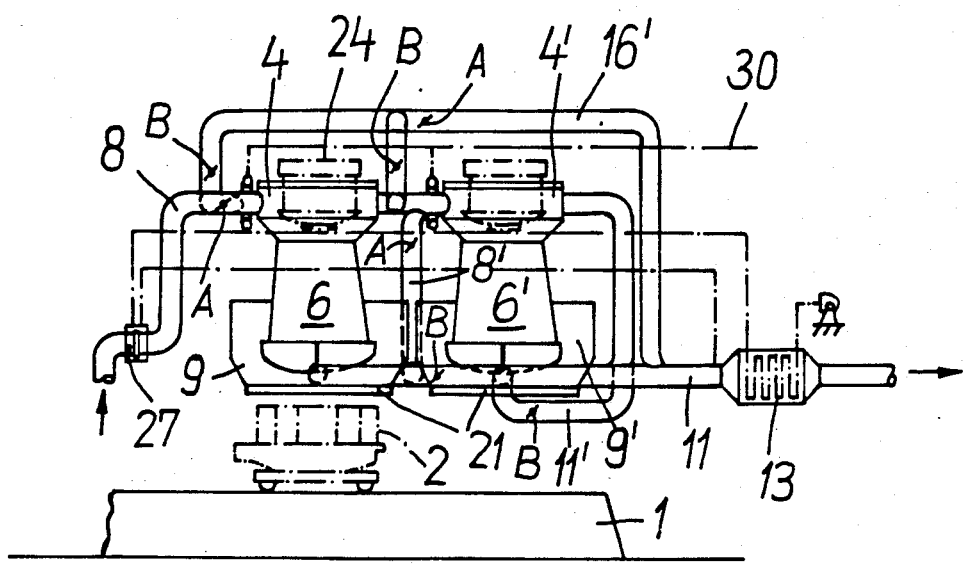
FIG. 3 is a vertical sectional view of a pre-heating station in a system having two juxtaposed preheating vessels and one furnace vessel.

The embodiment according to FIG. 3 differs from the two preceding embodiments in that two vessels 6 and 6' are arranged next to one another in a manner such that crucible 2 can be moved underneath both vessels. The gas supply is designed in such a way that the gas flows through both vessels in succession and each vessel can be used alternatingly as the first vessel through which the gas flows first.

The gas flows are controlled in a well known manner by using valves A and B which are preferably formed as flap valves and arranged in the gas intake conduit 8, the gas discharge conduit 11, the by-pass line 16, a further gas discharge conduit 11' connecting the housing 9' of the second vessel 6' to the conduit 8, and a further conduit 8' which connects the conduits 11 and 16' to the intake funnel 4' of the vessel 6'. If the three valves A are opened and the three valves B are closed, the gas flows first through the first vessel 6 and thereafter through the second vessel 6' as can be seen in FIG. 3 of the drawings. If the valves B are opened and the valves A are closed the alternating gas flow is reached.

If the gas shall flow over the by-pass line 16' directly to the discharge conduit 11, the valves B and A in the by-pass line 16' has to be opened and the valve A in the intake conduit 8 and the valve B in the conduit 8' has to be closed. Of course it is possible to lead the gas flow only through one of the two vessels by suitable controlling of the respective valves.

Moreover, the exhaust gas may also by-pass both vessels by being conducted through by-pass conduit 16'. In practical terms, in contrast to the simplified illustration in the drawing, the two vessels are advisably arranged in such a manner that the length of the exhaust gas intake conduit 8 is about the same for each vessel if the respective vessel is connected to the exhaust gas intake conduit 8 to be the first vessel through which the gas flows. The remaining conduits and connections again correspond to those of the embodiments according to FIGS. 1 and 2.

Figure 4:
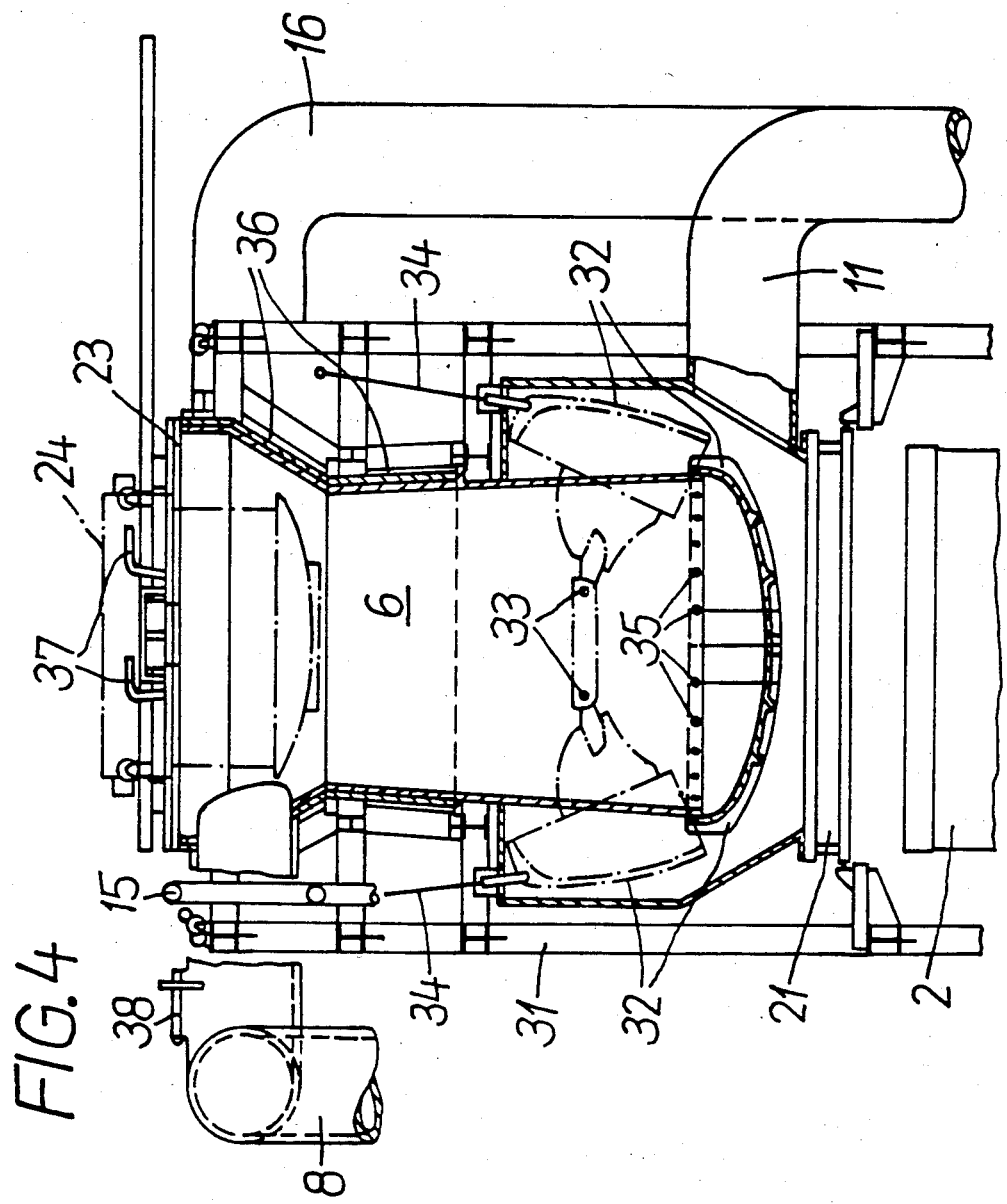
FIG. 4 is a vertical sectional view of the pre-heating vessel of FIG. 1 to a larger scale.

FIG. 4 shows more clearly the configuration and arrangement of the vessel 6 in a stand 31. The two shells 2 of the bucket-like charging opening 5 are each pivotally suspended on the sides of vessel 6 at two oppositely disposed and equiaxial hinges and can be raised or lowered to open or close the charging opening 5 by means of a winch device 34 which engages at the center of the outer circumference of the shells.

Shells 32 are additionally provided with openings 35 for the discharge of exhaust gas. These openings are uniformly distributed over their outer circumference near their upper horizontal edge. The shells are manufactured of a highly heat-resistant sheet steel.

In the upper region, the wall of vessel 6, which is a cast body, is provided with cooling elements 36 connected to a cooling water supply. The covering slide 23 is provided with connections for externally heated burners 37. For reasons of safety, the exhaust gas intake conduit 8 is provided with an explosion flap 38 in the vicinity of where it opens into the upper end of the vessel 6. Further explosion flaps may be disposed in the slide 23 which covers the combustion chamber and filling funnel 4, respectively.

If, for example, a melting vessel is employed which has an approximate diameter of 5.5 m, and the height between the shaft plate and the upper edge of the crucible is about 2.6 m, the volume of the crucible is about 72 $m^3$ so that approximately 65 tons of scrap having a specific weight of about 0.9 Kg can be charged.

The time required from charge to charge in such a system depends on the electrical power of the melting furnace and is between about 30 and 45 minutes. This results in a production rate of about 1.2 to 1.6 t/min. The energy utilization of the exhaust gas is thus significantly increased and is increased even further since the charging processes are minimized by the fact that the melting vessel and the pre-heating vessel have matching volumes.

The invention now being fully described, it will be apparent to one of ordinary skill in the art that many changes and modifications can be made thereto without departing from the spirit or scope of the invention as set forth herein.

The present disclosure relates to the subject matter disclosed in European Patent application No. 85116373.3 of Dec. 20th, 1985, the entire specification of which is incorporated herein by reference.

What is claimed is:

1. In a method of melting a metal material in a melting furnace provided with at least one melting vessel comprising directly pre-heating the material with exhaust gases of the melting furnace in at least one pre-heating vessel which can be emptied into the melting furnace, discharging the heated material from the pre-heating vessel into the melting vessel and melting the heated material in the furnace, the improvement wherein said steps of pre-heating and melting comprise placing said pre-heating and melting vessels in a respective first position; melting a first quantity of the material in the melting vessel in the melting furnace while simultaneously pre-heating a second quantity of the material in the pre-heating vessel by supplying the exhaust gases from the melting furnace to the pre-heating vessel; and removing the melted first quantity of material from the melting vessel; and said step of discharging comprises, effecting a first relative movement between said pre-heating and melting vessels to bring said pre-heating vessel above said melting vessel, then discharging the pre-heated second quantity of material into the melting vessel, and then effecting a second relative movement for placing the vessels in the respective first position and wherein the melting vessel is movable and the pre-heating vessel is stationary.

2. The method of claim 1, wherein one melting furnace and one pre-heating vessel is used.

3. The method of claim 1, wherein one melting furnace and two pre-heating vessels are used.

4. The method of claim 1, wherein the at least one melting furnace is provided with electric arc heating.

5. The method of claim 1, further comprising adding an oxygen-containing gas to burn the exhaust gases.

6. The method of claim 4, wherein the oxygen-containing gas is air.

7. The method of claim 6, further comprising
pre-heating the air with waste heat generated in the process.

8. The method of claim 1, further comprising providing additional energy for pre-heating.

9. The method of claim 8, wherein the additional energy is provided by burner heating.

10. The method of claim 1, further comprising
introducing an additive into the pre-heating vessel before charging the material.

11. The method of claim 10 wherein the additive is lime.

12. The method of claim 1, wherein
one melting furnace and at least two stationary pre-heating vessels are used and are positioned at essentially identical height positions; and
the vessels are alternatingly connected in series to receive the exhaust gases.

13. The method of claim 1, wherein at least two vessels are superposed, the exhaust gas exiting from the lowermost vessel subsequently flows through the thereabove disposed vessel or vessels.

14. The method of claim 1, further comprising removing the exhaust gases escaping from each vessel during charging.

15. The method of claim 1, further comprising continuously determining the amount of exhaust gases produced and the consistency of the material employed; and automatically regulating the degree of pre-heating by means of a computer on the basis of the amount of gases produced and the consistency of the material.

16. A method as defined in claim 1 further comprising charging said pre-heating vessel with metal material to be pre-heated while said vessels are in the respective first positions.

17. In an apparatus for melting a metal material comprising a melting furnace, at least one melting vessel and at least one pre-heating vessel which can be emptied and wherein the material is pre-heated with exhaust gases from the melting furnace, the improvement wherein the pre-heating vessel is stationary and is a chute-like vessel having a closable filling funnel and an exhaust gas intake at its upper end, and a closable charging opening and an exhaust gas outlet at its lower end; and said apparatus comprises means for moving the melting vessel between at least a first position and a second position, the first position being at the melting furnace and the second position being below the pre-heating vessel.

18. The apparatus of claim 17, wherein the pre-heating vessel is conically tapered toward the top.

19. The apparatus of claim 17, further comprising a housing encasing the charging opening of the pre-heating vessel, said housing being provided with a bottom which is closable and at least one opening for the discharge of exhaust gases; and wherein the charging opening is a bucket-like opening having other openings distributed on its outer circumference for the discharge of exhaust gases.

20. The apparatus of claim 17, wherein the cross section of the pre-heating vessel has a configuration effective to substantially reduce the velocity of the gases flowing through.

21. The apparatus of claim 17, further comprising a conduit for the intake of exhaust gases into the pre-heating vessel; and wherein at least part of the pre-heating vessel, the conduit or both are heat-resistant.

22. The apparatus of claim 21, wherein the heat-resistance is effected by a refractory lining.

23. The apparatus of claim 21, wherein the pre-heating vessel has walls; and at least one of the walls of the pre-heating vessel and the exhaust gas intake conduit is cooled.

24. The apparatus of claim 23, wherein the at least one of the pre-heating vessel and the exhaust gas intake conduit is cooled by means of water.

25. The apparatus of claim 17, wherein the filling funnel of the pre-heating vessel further comprises a charging bucket receiving device.

26. The apparatus of claim 17, further comprising a continuous charging device connected to the pre-heating vessel.

27. The apparatus of claim 26, wherein the charging device is an encapsulated conveyor belt.

28. The apparatus of claim 26, further comprising a collecting vessel which is emptied from the bottom and is positioned between the charging device and the pre-heating vessel.

29. The apparatus of claim 19, wherein the bucket-like charging opening has sides and shells and is downwardly curved, and the shells can be folded away to the sides.

30. The apparatus of claim 29, wherein the charging opening has two shells.

31. The apparatus of claim 17, wherein the upper region of the pre-heating vessel further comprises a combustion chamber.

32. The apparatus of claim 17, wherein the filling funnel is a combustion chamber.

33. The apparatus of claim 31, further comprising at least one burner which opens from the top into the combustion chamber and is heated with additional energy.

34. The apparatus of claim 31, further comprising at least one burner which opens from the top into the combustion chamber and is heated with additional energy.

35. The apparatus of claim 17, further comprising conduit for the discharge of exhaust gases;
a by-pass conduit;
oxygen-containing gas supplied for further burning of the exhaust gases; and
a heat-exchanger connected to the exhaust gas conduit following the exhaust gas discharge and behind a point where the by-pass conduit circumventing the pre-heating vessel opens into the exhaust gases conduit to pre-heat the oxygen-containing gas.

36. The apparatus of claim 21, wherein the exhaust gas intake conduit further comprises a connecting pipe which can be sealed with a mist of gas; said pipe being included in the conduit.

37. The apparatus of claim 36, wherein the mist of gas is formed of at least one of exhaust gases returned from the exhaust gas discharge or pre-heated air.

38. The apparatus of claim 17, further comprising an encapsulation of the melting furnace provided below the charging opening and having a closable opening for the passage of the melting vessel and an exhaust gases extraction opening.

39. The apparatus of claim 16, further comprising a cover for the movable melting vessel, the cover being provided with an exhaust gas discharge opening and being movable at least between an open position and a closed position.

40. The apparatus of claim 39, wherein the cover further comprises at least one electrode or one plasma burner.

* * * * *